Nov. 15, 1927.

M. RAHR, JR 1,648,961

STORAGE SLING FOR AUTOMOBILE SIDE CURTAINS

Original Filed July 15, 1920

INVENTOR.

Maximillian Rahr Jr.

BY

Erwin, Wheeler & Woolard

ATTORNEYS

Patented Nov. 15, 1927.

1,648,961

UNITED STATES PATENT OFFICE.

MAXIMILIAN RAHR, JR., OF MANITOWOC, WISCONSIN.

STORAGE SLING FOR AUTOMOBILE SIDE CURTAINS.

Original application filed July 15, 1920, Serial No. 396,346. Divided and this application filed August 16, 1923. Serial No. 657,671.

This invention relates to storage slings for automobile side curtains.

It is the primary object of this invention to provide a novel and improved storage sling which can be permanently secured in place beneath the top or canopy of a motor vehicle, together with means for drawing said curtains into and from said sling without adjusting, opening, or displacing the position of the sling. In most vehicles curtain supporting means are provided which require manipulation for the insertion or withdrawal of curtains. Some portion of such a sling is generally arranged to be opened and closed through the use of glove fasteners, curtain fasteners, or other like securing means. When the securing means have been adjusted to releasing position an envelope or pocket or other storage compartment is usually accessible into which the curtains may be inserted. Such manipulation, however, is unduly difficult due to the fact that the operator's hands must be held above his head and his body must frequently be held in a cramped or strained position pending the insertion or removal of the curtains. In order to hold the curtains securely a large number of glove fasteners or other securing devices are required, and a consequently great period of time is necessary upon each insertion or withdrawal of a curtain. It is my further object, therefore, to facilitate the work of the operator by doing away with the fastening devices commonly used in connection with curtain slings.

It is a further object of this invention to enhance the appearance of the top or canopy of a motor vehicle through the provision of a sling of a particular character hereinafter to be disclosed. It is also my object to provide a curtain supporting structure of such a character that the curtains from each side of the machine may be simultaneously withdrawn for use and may similarly be returned to their respective positions of storage.

In the drawings.

Like parts are identified by the same reference characters throughout the several views.

Figure 1:
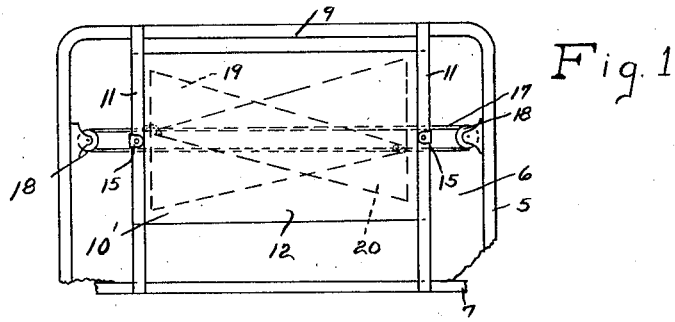
Figure 1 is an inverted plan view of a portion of an automobile top or canopy provided with curtain storage means embodying this invention.

The device shown in Figure 1 is illustrated in my Patent No. 1,469,109 issued September 25, 1923, and entitled "Automobile accessories", of which this application constitutes a division.

A supporting frame of an automobile top or canopy is indicated at 5. The canopy proper which is supported from said frame is shown at 6 and ordinarily comprises a fabric covering in the case of open cars and a wooden, metallic, or fabric covering in the case of closed cars. It will be understood that this invention is equally adapted for use in open cars, i. e. in those cars which have folding tops, and in those semi-open cars in which the tops are permanent but in which side windows of glass are not provided. In other words, this invention is adapted for use in any car having need for side curtains.

The invention is illustrated in connection with one form of top commonly used upon open cars. In this form of top the frame 5 includes intermediate bows 7 which extend transversely beneath the canopy 6 to maintain the canopy in a properly distended position. Similar transverse bows 8 and 9 extend transversely of the canopy at its front and rear margins.

Figure 2:
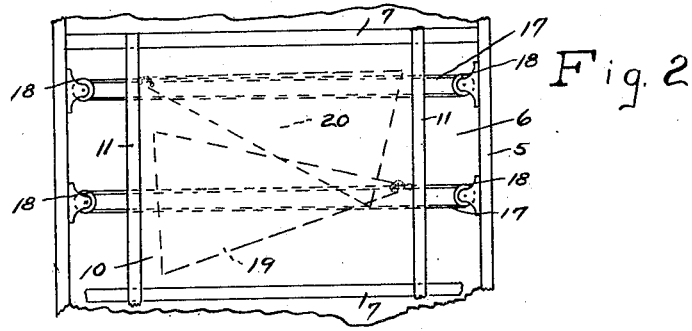
Figure 2 is a similar view of an automobile top showing a modified device for curtain storage.
Figure 4:
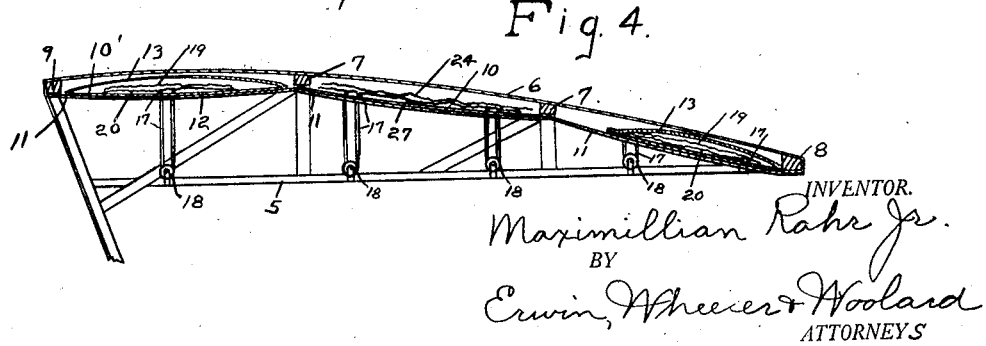
Figure 4 is a longitudinal sectional view through an automobile top showing various embodiments of this invention.

This invention contemplates the provision between each adjacent pair of bows included in the frame 5 a sling 10 which is preferably made of fabric to match the interior of the canopy 6. The sling 10 may, if desired, constitute a single web of material extending from bow to bow as indicated in Figure 2, in which the web 10 is shown to extend longitudinally of the top between the two intermediate bows 7. The sling may be re-enforced at its margins by strips 11 if desired. This single web type of sling is shown in section in the central portion of Figure 4 between the bows 7.

Where it is desired to confine the side curtains more closely, I provide a type of sling shown at 10′ in Figures 1 and 4, and including a lower web 12 and an upper web 13. The webs 12 and 13 may be stitched together along their end margins so that the sling 10' comprises a flattened tube open at both sides. The side margins of the web 12 may be re-enforced, as in the construction above described, by tapes 11 which may be extended respectively into engagement with the bows 7 and 9 of the top frame 5 or with any other adjacent bows of said frame. Thereby the re-enforcing tapes 11 are made to serve to support the sling or envelope 10' intermediate two adjacent bows. Where a double wall sling, such as is shown at 10', is used, it is possible to provide upon the walls 13 of said sling tabs 15 which may be secured by glove fasteners or other suitable devices to the tapes 11 upon the lower walls 12 of the sling. Such tabs are not really necessary in the practice of this invention but may be used if desired. Comparatively few such securing means will close an envelope or sling such as is shown at 10' against the possibility of the ingress or egress of side curtains.

Curtains are introduced into the sling 10 or 10' through the open sides thereof and may be caused to slide into place from opposite sides of the sling until the corresponding curtains for opposite sides of the vehicle are disposed within the sling in superimposed or partially superimposed relation as indicated in dotted lines in the drawings. To facilitate the introduction of the curtains I prefer to provide an endless cord passing about pulleys on opposite sides of the car. One or more such cords may be used in connection with each curtain storage sling 10 or 10'. In Figure 1 there is illustrated a single endless cord 17 which passes about pulleys 18 supported from the frame 5 at opposite sides of the top. It is not necessary that the cord 17 be at all taut. The cord simply extends about said pulley, passing upwardly if necessary to enter the envelope or sling 10', and serves to facilitate the introduction of side curtains into the sling in a readily understood manner. It will be noted that the apex of the triangular side curtain 19 shown in Figure 1 is secured to one strand of the endless cord 17, whereas the apex of the curtain 20 is secured to the opposite strand of said cord. Consequently, when cord 17 is manually manipulated to move about pulleys 18 in a counter-clockwise direction, as viewed in Figure 1, curtains 19 and 20 will readily be brought to the positions in which they are indicated. When it is desired to remove such curtains, the operator can readily grasp the curtains simultaneously and withdraw them from opposite sides of the sling. Ordinarily the curtains have sufficient inflexibility so that the operator, by grasping one of the curtains and withdrawing it, can cause the other one to slide from the opposite side of the receptacle 10'.

Due to the fact that the curtains, when connected to a single endless cord 17, as shown in Figure 1, must necessarily move in opposite directions if at all, it will be obvious that momentum or other forces tending to throw one of the curtains through the side opening of the storage sling 10' must necessarily be counter-acted by corresponding forces acting oppositely upon the other of said curtains. Consequently, as aforesaid, there is no need for the provision of tabs 15 or other securing means.

If desired, a separate endless cord 17 may be provided for each of the side curtains 19 and 20. In Figure 2 the apex of curtain 19 is shown to be connected with one strand of the cord 17 toward the bottom of the drawing, whereas the apex of curtain 20 is shown to be connected to the cord 17 toward the top of the drawing. This arrangement is not preferred, however, since it necessitates the separate manipulation of each curtain to and from its place of storage in the sling 10 or 10'.

Figure 3:
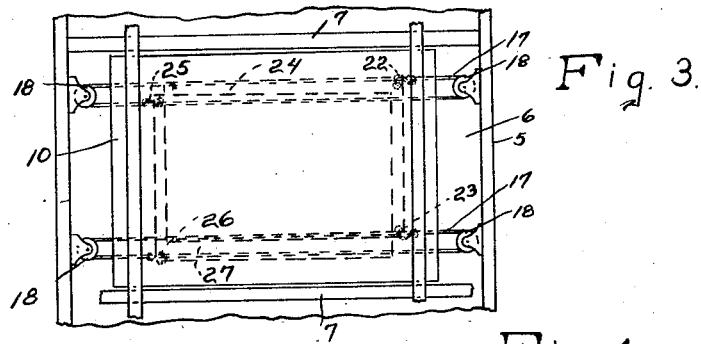
Figure 3 is a similar view of an automobile canopy showing a further modified device for curtain storage.

It is possible to connect each side curtain to a plurality of endless cords. Such an arrangement is shown in Figure 3 and is particularly useful where rectangular curtains of comparatively large size are to be handled. For the sake of illustration the sling illustrated in Figure 3 may be taken to be of the type shown at 10 in Figure 2. As in Figure 2, there are two endless cords extending through the storage sling and about suitable pulleys 18 upon opposite sides of the top frame 5. Instead, however, of securing the curtains individually to such cords, I may secure each of the more advanced corners 22 and 23 of curtain 24 to corresponding strands of the two cords 17, respectively. The more advanced corners 25 and 26 of curtain 27 are similarly secured, respectively, to the opposite corresponding strands of the two endless cords 17. As a result of this construction, the cords 17 will tend to move in unison and may readily be caused to do so, thereby advancing the curtains 24 and 27 simultaneously into the sling 10. Obviously, the retraction of either curtain will bring about the expulsion of the other through the action of the endless cords 17, which are both connected to both of the curtains.

In the practice of this invention it is considered to be a great advantage to have each curtain stored immediately adjacent the point at which it is used. It is not necessary to open a storage envelope and hunt through its contents for a particular curtain for use in a particular location on the car. The arrangement herein disclosed is such that each curtain taken from storage can be used in but one location. The curtain desired for any given location is instantly accessible and, unless the tabs 15 are provided, the curtain may be had without previously manipulating any clasps or fastenings of any sort.

The process of storing the curtains away is equally simple as can readily be understood from the above description. The act of putting away a curtain from one side of the vehicle automatically results in the storage of the corresponding curtain from the opposite side, unless the construction shown in Figure 2 is used, in which case each curtain will have to be stored individually. In any event, however, the storage may be accomplished more quickly than with any other device of which I am aware. Furthermore, the appearance of the vehicle equipped with storage slings embodying this invention is enhanced for the reason that the space between each pair of bows may be similarly treated, so that the top of the car will present a uniform appearance from front to rear.

I claim:

1. The combination with a vehicle top provided with oppositely disposed frame members and transversely extending bows, of tapes connected with adjacent bows, a web suspended upon said tapes, pulleys connected with said members and laterally disposed of said tapes, an endless cord passing about said pulleys and above said web and having portions accessible laterally of each tape, and a pair of side curtains connected respectively with oppositely movable portions of said cord and adapted to be drawn upon said web from opposite sides thereof upon the manipulation of said cord.

2. The combination with a vehicle top provided with oppositely disposed frame members and transversely extending bows, of tapes connected with adjacent bows, a web suspended upon said tapes, pulleys each connected with a frame member and spaced from said tapes, an endless cord passing about said pulleys and above said web, said cord having a portion accessible laterally of one of said tapes, and a curtain connected with a portion of said cord, whereby said cord may be manipulated to move said curtain into and out of said compartment.

MAXIMILIAN RAHR, Jr.